(No Model.)
J. F. SWAB.
Transportation Can.
No. 237,710. Patented Feb. 15, 1881.
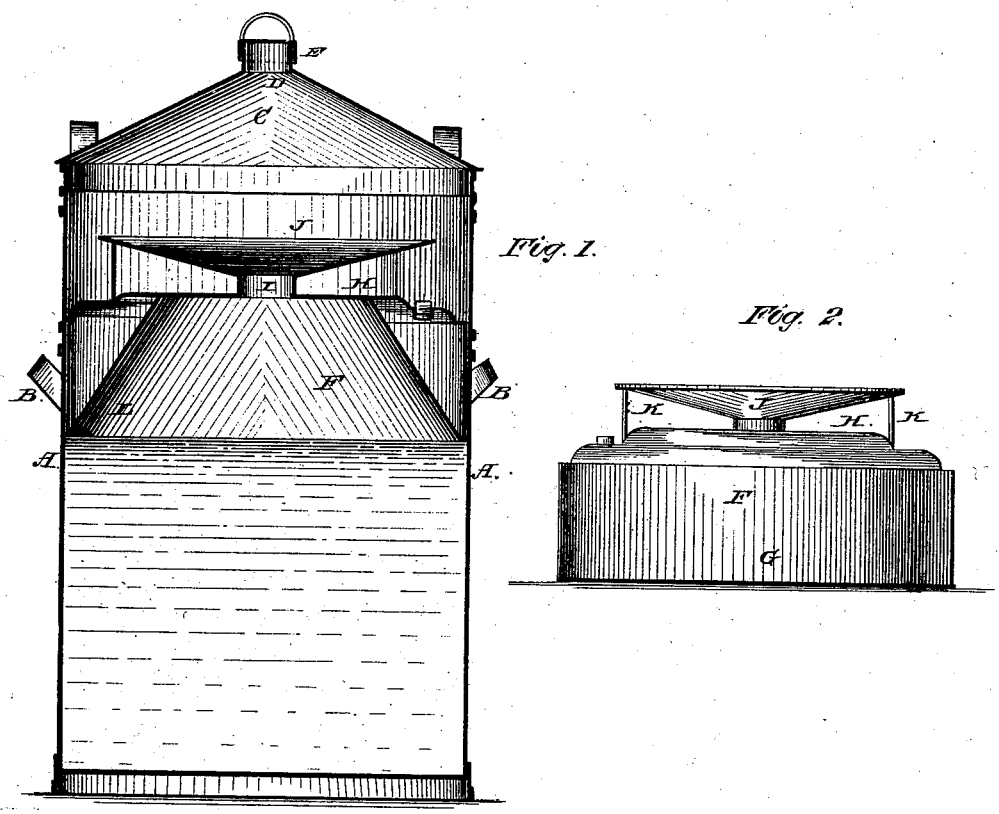

UNITED STATES PATENT OFFICE.

JOSEPH F. SWAB, OF CEDAR RAPIDS, IOWA.

TRANSPORTATION-CAN.

SPECIFICATION forming part of Letters Patent No. 237,710, dated February 15, 1881.

Application filed January 3, 1881. (No model.)

*To all whom it may concern:*

Be it known that I, JOSEPH F. SWAB, of Cedar Rapids, in the county of Linn and State of Iowa, have invented certain new and useful Improvements in Transportation-Cans; and I do hereby declare that the following is a full, clear, and exact description of the invention, which will enable others skilled in the art to which it appertains to make and use the same, reference being had to the accompanying drawings, which form a part of this specification.

This invention relates to cans or vessels for the transportation of milk, cream, &c.; and it consists in the combination, with a cylindrical or other suitably-shaped can, of a peculiarly-constructed float, having for its object to prevent the agitation of the milk or cream, by which it is not only liable to be splashed over the top edges of the can, but also to be churned, and thus rendered unfit for the uses for which it was intended.

In the drawings, Figure 1 is a vertical sectional view of the can and float. Fig. 2 is a view of the float detached.

Corresponding parts in the several figures are denoted by like letters of reference.

A represents a can or vessel, which is preferably cylindrical in shape. Said can is provided with handles B B and with a suitable cover, C, having an opening, D, for the admission of milk into the can, which opening is provided with a small cover, E.

F is the float, which consists of a rim, G, fitting nicely in the can A, so as to be capable of sliding vertically therein. Said rim is provided with a top or cover, H, having a central opening, I, around which is secured a funnel, J, connected to the said top H by braces K. The lower edge of the rim G is connected with the top H by a bottom, L, slanting from a point near the central perforation to the lower edge of the rim, as shown.

In operation the float F is first placed in the can. The fluid to be transported—milk or cream—is then admitted into the can, where it passes through the central perforation of the float, causing the latter to rise in the can. During transportation, when the milk is liable to splash over the sides of the can, it will be guided, by the slanting bottom, to the central perforation in the float, through which the milk which may splash up above the latter will invariably return to the body of the can. Agitation of the milk and the injury resulting therefrom is, however, almost entirely prevented by the float. The funnel J forms a convenient handle by which the float may be lifted out when it is desired to remove the contents of the can.

This invention is simple and inexpensive, and its advantages will be readily appreciated.

Having thus described my invention, I claim and desire to secure by Letters Patent of the United States—

The combination, with a can or vessel for the transportation of milk, &c., of a vertically-sliding float having a top, slanting bottom L, and a central opening, I, and a funnel, J, arranged above and connected to said float and communicating with said opening I, substantially as herein described, for the purpose shown and specified.

In testimony that I claim the foregoing as my own I have hereto affixed my signature in presence of two witnesses.

JOSEPH F. SWAB.

Witnesses:
WILLIAM F. MANZ,
A. ST. CLAIR SMITH.